UNITED STATES PATENT OFFICE.

WILLIAM S. BATES, OF CHICAGO, ILLINOIS, ASSIGNOR OF TWO-THIRDS TO WALTER C. PEACOCK AND OSCAR F. ENGWALL, OF SAME PLACE.

FLUX FOR SOLDERING ALUMINIUM.

SPECIFICATION forming part of Letters Patent No. 648,831, dated May 1, 1900.

Application filed March 24, 1897. Serial No. 629,071. (No specimens.)

*To all whom it may concern:*

Be it known that I, WILLIAM S. BATES, of Chicago, Illinois, have invented certain new and useful Improvements in Fluxes for Soldering Aluminium, whereof the following is a specification.

My invention consists in the discovery, made by myself, that fluorids, combined with easily-fusible chlorids and other halogens, constitute efficient soldering fluxes for aluminium.

In carrying out my invention I mix lithium chlorid with potassium fluorid, and for convenience in use fuse them together and pulverize them. The proportions of the salts may be varied considerably; but those which I prefer are ten parts, by weight, of lithium chlorid and two parts of potassium fluorid. If the fluorid is in excess, the flux fuses at too high a temperature and the aluminium is liable to be attacked. Therefore I call the other salt a "diluent." In some cases the addition of other chlorids to the above is beneficial, especially the chlorids of lead and zinc, and the lithium chlorid may be entirely substituted by such chlorids without destroying the efficiency of the flux. Lithium chlorid, however, has a special utility in this connection because of its low fusing-point and great fluidity when fused, and its presence is always desirable. So, also, other fluorids may be substituted for potassium fluorid. I have thus used sodium, calcium, lead, zinc, and other fluorids. All such changes are within my invention, as also is the use of other equivalent salts for the above.

With this flux ordinary solders may be used. I have obtained good results with tin, lead, zinc, and various alloys thereof, including common plumbers' solder, also with silver solder and with alloys of aluminium and tin containing as high as seventy per cent. of aluminium and with other solders.

I claim—

1. A flux for soldering aluminium containing two halogen salts, one of said salts being a fluorid, substantially as set forth.

2. A flux for soldering aluminium containing a chlorid and a fluorid, substantially as set forth.

3. A flux for soldering aluminium containing lithium chlorid and a fluorid, substantially as set forth.

4. A flux for soldering aluminium containing lithium chlorid and potassium fluorid, substantially as set forth.

5. A flux for soldering aluminium, containing a fluorid and a fusible diluent, substantially as set forth.

WILLIAM S. BATES.

In presence of—
JULIA M. BRISTOL,
JOHN L. JACKSON.